United States Patent [19]
Davis

[11] 3,725,582
[45] Apr. 3, 1973

[54] SIMULTANEOUS DIGITAL TRANSMISSION IN BOTH DIRECTIONS OVER ONE LINE

[75] Inventor: William John Davis, North Palm Beach, Fla.

[73] Assignee: RCA Corporation, New York, N.Y.

[22] Filed: Dec. 9, 1970

[21] Appl. No.: 96,492

[52] U.S. Cl. .......................................178/58, 178/60
[51] Int. Cl. ................................................H04l 5/14
[58] Field of Search ..................................178/58–60

[56] References Cited

UNITED STATES PATENTS 3,573,371 4/1971 Carbone et al. ........................178/60

*Primary Examiner*—John W. Caldwell
*Assistant Examiner*—Marshall M. Curtis
*Attorney*—H. Christoffersen and Carl V. Olson

[57] ABSTRACT

A duplex digital signalling system includes a transmission line having characteristic impedance terminations, a transmitter at each end of the transmission line for supplying digital signals through the characteristic impedance termination to the transmission line, and a differential receiver at each end of the transmission line. A resistor network couples each receiver across the local characteristic impedance termination, so that each receiver responds only to the distant transmitter, and digital information may be simultaneously transmitted in both directions through the transmission line.

3 Claims, 4 Drawing Figures

Inventor:
WILLIAM J. DAVIS
By Carl V. Olson
Attorney

Inventor:
WILLIAM J. DAVIS
By Carl V. Olson
Attorney

SIMULTANEOUS DIGITAL TRANSMISSION IN BOTH DIRECTIONS OVER ONE LINE

BACKGROUND OF THE INVENTION

Computer systems often involve a plurality of units, such as basic processors, memories and input-output devices, which are located some distance apart and are connected by cables. Since a considerable number of signal lines must be provided, the cost, complexity and space requirements of the cabling system are substantial.

SUMMARY OF THE INVENTION

In order to reduce the number of signal cables, a system is provided which permits the simultaneous transmission in both directions of digital signals over a single line. The line may be a conductor pair, or a single conductor with a common ground return. The line conductors are provided with characteristic impedance terminating resistors, and a differential receiver at each end of the line is coupled by a resistor network to both sides of the local terminating resistor. The network is constructed so that a receiver is responsive to a distant transmitter, and is unresponsive to a local transmitter.

DETAILED DESCRIPTION OF PREFERRED EMBODIMENTS

Figure 1:
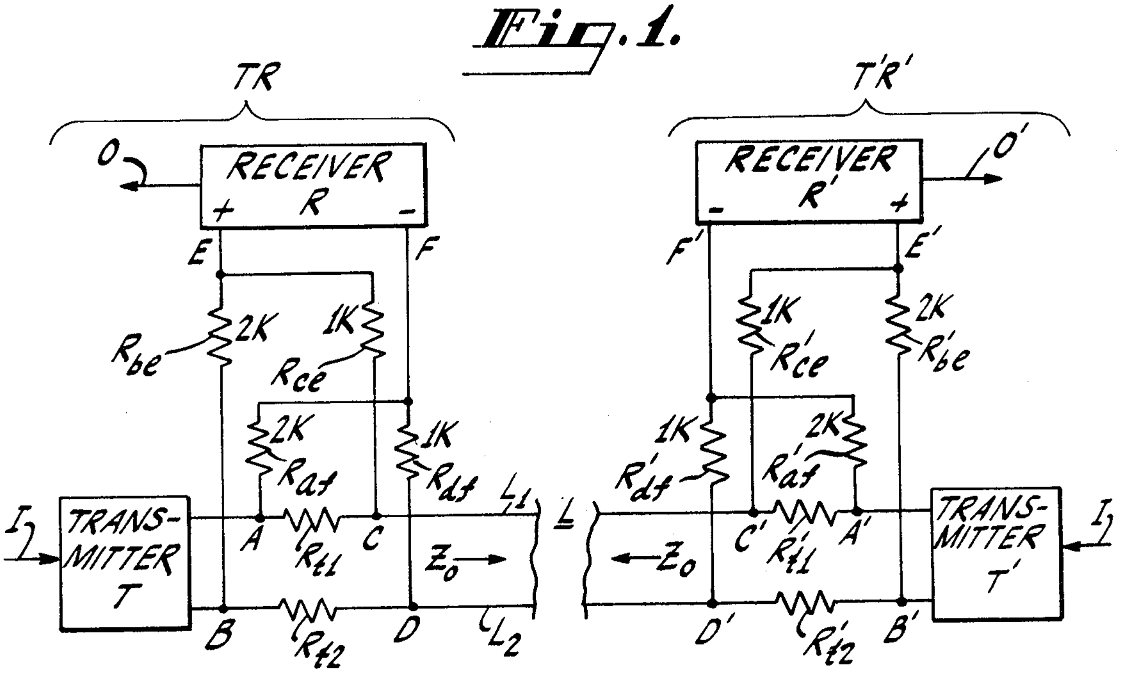
FIG. 1 is a diagram of a balanced transmission line having send-receive units at each end which permit digital information to be simultaneously transmitted in both directions through the transmission line.

Reference is now made to FIG. 1 for an illustration of a duplex digital signalling system employing bipolar voltage signals, and including a balanced transmission line L and two transmit-receive units TR and T'R'. The transmission line L consists of two conductors $L_1$ and $L_2$ having a characteristic impedance $Z_0$, and having any desired length up to a length at which the direct-current resistance of the line is significant in relation to the resistance of the terminating resistors. Lengths up to 200 feet and greater are entirely practical. The transmission line may, for example, have a characteristic impedance of about 140 ohms. In the transmit-receive unit TR, the transmission line conductors $L_1$ and $L_2$ are provided with series-connected, characteristic impedance terminating resistors $R_t$, each having a value equal to one-half the balanced characteristic impedance of the line.

The transmit-receive unit TR includes a transmitter T having outputs connected to the terminals A and B of the terminating resistors $R_t$, and has a logic input terminal I for receiving "1" and "0" digital information signals to be transmitted.

The transmit-receive unit TR also includes a differential receiver R having a normal or positive input terminal E, and an inverting or a negative input terminal F. The input terminals E and F of the receiver are connected by a resistor network to terminals A, B, C and D of the terminating resistors $R_t$. The resistor network includes a resistor $R_{be}$ connected between transmitter output terminal B and receiver input terminal E, a resistor $R_{af}$ connected between transmitter output terminal A and receiver input terminal F, a resistor $R_{ce}$ connected from the line terminal C to the receiver input terminal E, and a resistor $R_{df}$ connected from the line terminal D to the receiver input terminal F. The resistors $R_{be}$ and $R_{af}$ are preferably of equal value and may have a value of 2,000 ohms, by way of example. The resistors $R_{ce}$ and $R_{af}$ are preferably of equal value and have a value half that of the previously recited resistors, so that they are, in the example, equal to 1,000 ohms each.

The transmitter T may, for example, be any suitable integrated circuit unit commonly known as a differential line driver having a bipolar output. The Type 9614 differential line driver, made and sold by Fairchild Semiconductor Division of Fairchild Camera and Instrument Corp., may be used with the addition of an output stage providing a bipolar output. The differential receiver R may, for example, be any suitable commercially-available integrated circuit unit such as the Type SN75107 line receiver manufactured and sold by Texas Instruments, Inc.

The transmit-receive unit T'R' at the opposite end of the transmission line is identical with the send-receive unit TR and is shown as a mirror image in the drawing with the corresponding elements having the same designation with a prime mark added.

In the operation of the system of FIG. 1, there are four different direct-current conditions possible in the system depending on the digital information bits being simultaneously transmitted by transmitters T and T'. That is, transmitter T may be transmitting a "1" or a "0." When transmitter T is transmitting a "0," transmitter T' may be transmitting either a "0" or a "1." Similarly, when transmitter T is transmitting a "1," transmitter T' may be transmitting either a "0" or a "1." Therefore, there are four possible direct-current conditions in the system as shown in the following chart:

TABLE 1.—CONDITIONS IN FIG. 1

| TR | | | | | | | T'R' | | | | | | |
|---|---|---|---|---|---|---|---|---|---|---|---|---|---|
| In | Voltage | | | | | Out | Out | Voltage | | | | | IN |
| I | A | B | C | D | EF | O | O' | E'F' | D' | C' | B' | A' | I' |
| "0" | −e | +e | −e | +e | −2e/3 | "0" | "0" | −2e/3 | +e | −e | +e | −e | "0" |
| "1" | +e | −e | 0 | 0 | −2e/3 | "0" | "1" | +2e/3 | 0 | 0 | +e | −e | "0" |
| "0" | −e | +e | 0 | 0 | +2e/3 | "1" | "0" | −2e/3 | 0 | 0 | −e | +e | "1" |
| "1" | +e | −e | +e | −e | +2e/3 | "1" | "1" | +2e/3 | −e | +e | −e | +e | "1" |

The first line in the above table represents the conditions in the system when the logic inputs to both transmitters T and T′ are logic "0" digital signals. In this case, the voltages at the outputs A and B of transmitter T are $-e$ and $+e$, respectively. Similarly, the voltages at the outputs A′ and B′ of transmitter T′ are also $-e$ and $+e$, respectively. Since the system is perfectly symmetrical, and since the transmission line is terminated at both ends in its characteristic impedance, the voltage $-e$ exists at points A and C, on the line conductor $L_1$, and at points C′ and A′. Similarly, the voltage $+e$ exists at points B and D, on the line conductor $L_2$, and at points D′ and B′.

The voltage at receiver input E is determined by the voltage dividing action of resistor $R_{be}$ connected to $+e$ volts at point B, and resistor $R_{ce}$ connected to $-e$ volts at point C. The voltage at receiver input E is thus $-e/3$. The voltage at receiver input terminal F is determined by the voltage dividing action of resistor $R_{af}$ connected to $-e$ volts at point A and resistor $R_{df}$ connected to $+e$ volts at point D. The differential input voltage EF applied to receiver R is thus equal to $-2/3e$ when the + input terminal E is considered as the reference point. The receiver R responds to the negative differential input signal EF to produce a logic "0" output on its output line 0. This logic output is in response to the "0" logic input supplied to input terminal I′ of the remote transmitter T′.

The above Table 1 of conditions in the system of FIG. 1 shows four possible different conditions. A receiver R or R′ responds to a negative differential input voltage EF or E′F′ to produce a "0" logic output, and responds to a positive differential input voltage to produce a "1" logic output. Whenever a logic input I to a transmitter is a logic "0," the logic output 0 or 0′ from the remote receiver is also a logic "0." Similarly, when the logic input I or I′ to a transmitter is a logic "1," the output 0′ or 0 of the remote receiver is always a logic "1."

The foregoing Table 1 describes the direct current voltage conditions in the system to explain how information can be simultaneously transmitted in both directions over the transmission line L. The system also operates to correctly transmit information in both directions under dynamic conditions, regardless of the timing of signals supplied to the line from both transmitters T and T′. When the two transmitters operate in a completely asynchronous manner, it is possible for the local transmitter output to change state immediately preceding, exactly coincident with, or slightly after an incoming wavefront is received that was propagated from the remote transmitter. However, the transmitter voltage swings are very large and very rapid in passing through the receiver threshold voltage range in which the receiver is uncertain in producing a "1" or a "0" logic output.

The transmitter output voltage may change over a range of ±4 volts or ±4,000 mV, and the receiver may have a threshold uncertainty range of only ±25 mV. Allowing for the voltage dividing action in the resistor network, the receiver threshold uncertainty voltage range is only about 1.25 percent of the transmitter output voltage swing. A transmitter voltage pulse rise time or fall time may be 10 nanoseconds, and 100 feet of cable may have a rise or fall time of 50 nanoseconds. Then, the time during which the 4,000 mV change passes through the ±25 mV threshold uncertainty of a receiver is only about 1.25 nanoseconds. The receiver cannot respond in such a short time to produce an incorrect logic output. The timing of the correct logic output of the receiver may be displaced a small amount in the range of about ±2 nanoseconds. This is insignificant in relation to normal response time variations in the system due to circuit and cable delays.

The described system has the advantage that the number of transmission lines L in a computer system may be reduced by up to one-half, compared with the number required when two separate lines are employed to transmit signals in the two different directions. The described system, however, has the modest disadvantage that the input signals supplied to the receivers have one-half the voltage swing that they would otherwise have when used with a one-direction line. The receivers therefore are somewhat less immune to noise disturbances on the line. Nevertheless, the described system can be constructed to provide its intended economic and practical advantages and still be completely reliable in the transmission of digital information in both directions on the transmission line.

Figure 2:
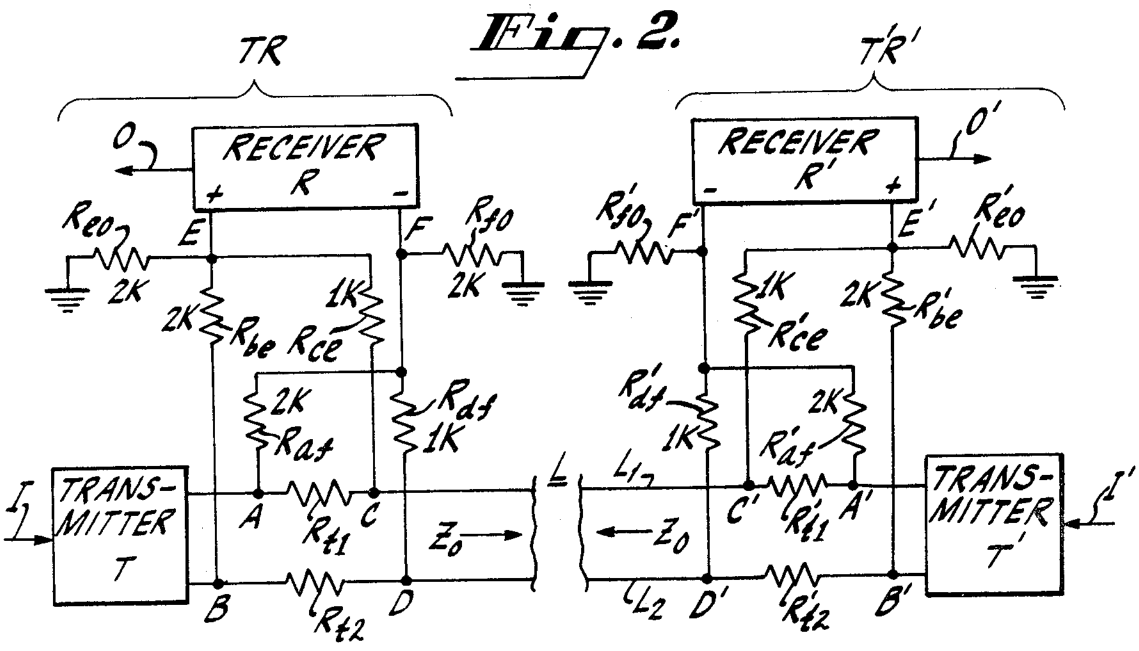
FIG. 2 is another embodiment of the system of FIG. 1 which differs in that it utilizes unipolar signals instead of bipolar signals.

Reference is now made to FIG. 2 where there is shown a system which is the same as shown in FIG. 1 except that the electrical signals produced at transmitter output terminals A and B are unipolar signals in which a logic "0" is represented by 0 volts at A and $+e$ volts at B, and a logic "1" is represented by $+e$ at A volts and 0 volts at B. The system of FIG. 2 includes additional resistors $R_{eo}$, $R_{fo}$, $R'_{eo}$ and $R'_{fo}$, each connected from a receiver input terminal to a point of zero or ground potential. These resistors are preferably of the same value, and, in the example, may have a value of 2,000 ohms.

The transmitter T may, for example, be any suitable commercially available integrated circuit unit commonly known as a differential line driver, such as the Type 9614 differential line driver made and sold by Fairchild Semiconductor Division of Fairchild Camera and Instrument Corp. The differential receiver R may, for example, be any suitable commercially available integrated circuit unit such as the Type SN75107 line receiver manufactured and sold by Texas Instruments, Inc.

The operation of the system of FIG. 2 is similar to the operation of the system of FIG. 1. In FIG. 2, the conditions existing under the four possible signalling conditions are as shown in the following table:

TABLE 2.—CONDITIONS IN FIG. 2

| TR | | | | | | | T′R′ | | | | | | |
|---|---|---|---|---|---|---|---|---|---|---|---|---|---|
| In | Voltage | | | | | Out | Out | Voltage | | | | | IN |
| I | A | B | C | D | EF | O | O′ | E′F′ | D′ | C′ | B′ | A′ | I′ |
| "0" | 0 | e | 0 | e | $-e/4$ | "0" | "0" | $-e/4$ | e | 0 | e | 0 | "0" |
| "1" | e | 0 | e/2 | e/2 | $-e/4$ | "0" | "1" | $+e/4$ | e/2 | e/2 | e | 0 | "0" |
| "0" | 0 | e | e/2 | e/2 | $+e/4$ | "1" | "0" | $-e/4$ | e/2 | e/2 | 0 | e | "1" |
| "1" | e | 0 | e | 0 | $+e/4$ | "1" | "1" | $+e/4$ | 0 | e | 0 | e | "1" |

A receiver R or R' produces a logic "0" output signal when the differential input signal EF or E'F' is a negative voltage, and produces a logic "1" output signal when the differential input signal is a positive voltage.

Figure 3:
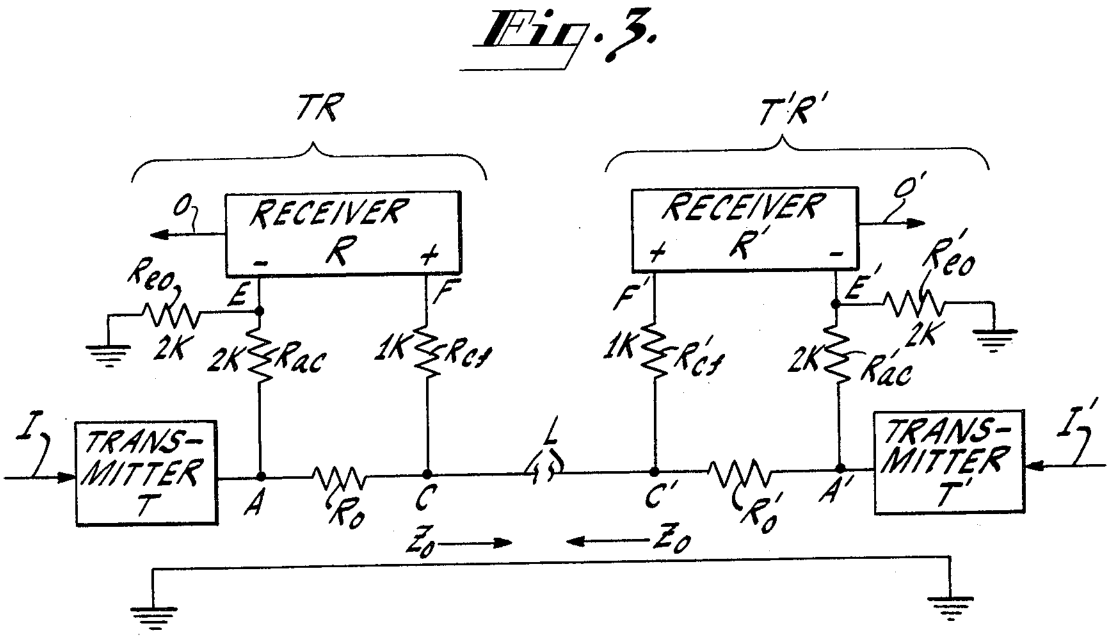
FIG. 3 is another embodiment of the invention employing a single-ended transmission line and bipolar signals.

Reference is now made to FIG. 3 for an illustration of another embodiment of the invention for use with a single-ended transmission line having a single conductor and a common ground or return path. The voltages supplied by the transmitters are bipolar signals in which a logic "0" is represented by $-e$ volts at terminal A or A', and a logic "1" is represented by a $+e$ volts at terminal A or A'. The system of FIG. 3 includes a single terminating impedance $R_0$ at each end of the single-ended conductor. Each terminating impedance has a value equal to the characteristic impedance of the line. In operation, the four possible conditions of the system are as listed in the following table:

TABLE 3.—CONDITIONS IN FIG. 3

| TR | | | | | T'R' | | | | |
|---|---|---|---|---|---|---|---|---|---|
| In | Voltage | | | Out | Out | Voltage | | | In |
| I | A | C | EF | O | O' | E'F' | C' | A' | I' |
| "0" | −e | −e | −e/2 | "0" | "0" | −e/2 | −e | −e | "0" |
| "1" | +e | 0 | −e/2 | "0" | "1" | +e/2 | 0 | −e | "0" |
| "0" | −e | 0 | +e/2 | "1" | "0" | −e/2 | 0 | +e | "1" |
| "1" | +e | +e | +e/2 | "1" | "1" | +e/2 | +e | +e | "1" |

Figure 4:
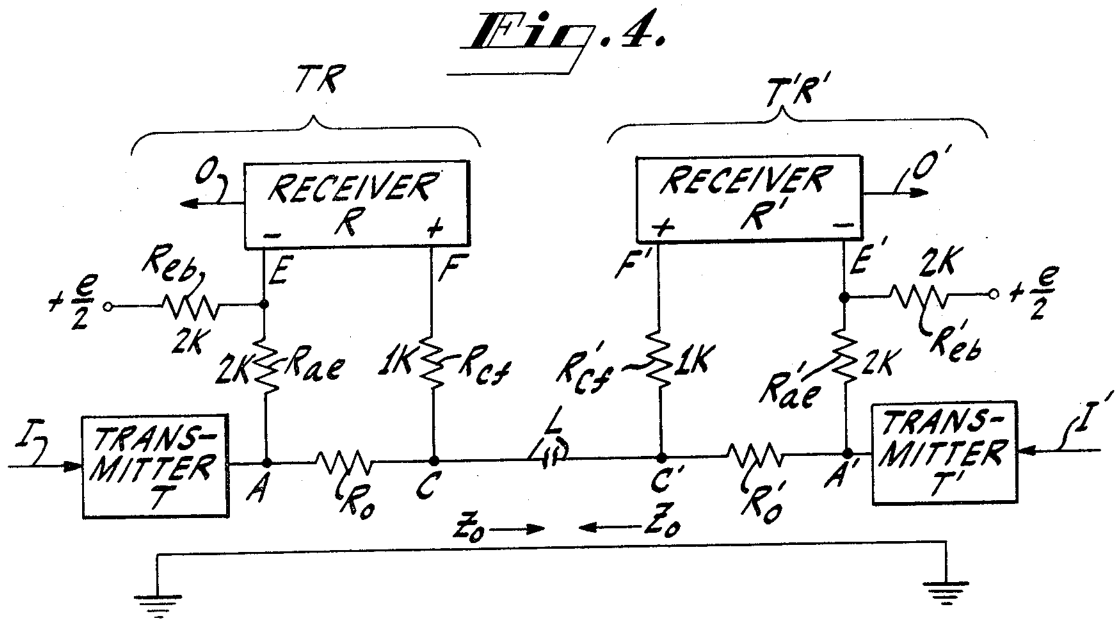
FIG. 4 is another embodiment of the system of FIG. 3 using unipolar signals instead of bipolar signals.

Reference is now made to FIG. 4 for an illustration of an embodiment of the invention including a single-ended transmission line, and being different from the embodiment of FIG. 3 in that the signals applied from the transmitters to the line are unipolar. That is, the signal applied by a transmitter to point A or A' is 0 volts to represent a logic "0," and is $+e$ volts to represent a logic "1."

The system of FIG. 4 differs from the system of FIG. 3 in that the resistors connected from the input terminals of the receivers are connected to a source of bias potential equal to $+e/2$, rather than to a point of 0 or ground potential. The four different conditions of the system are as listed in the following table:

TABLE 4.—CONDITIONS IN FIG. 4

| TR | | | | | T'R' | | | | |
|---|---|---|---|---|---|---|---|---|---|
| In | Voltage | | | Out | Out | Voltage | | | In |
| I | A | C | EF | O | O' | E'F' | C' | A' | I' |
| "0" | 0 | 0 | −e/4 | "0" | "0" | −e/4 | 0 | 0 | "0" |
| "1" | e | e/2 | −e/4 | "0" | "1" | e/4 | e/2 | 0 | "0" |
| "0" | 0 | e/2 | e/4 | "1" | "0" | −e/4 | e/2 | e | "1" |
| "1" | e | e | e/4 | "1" | "1" | e/4 | e | e | "1" |

The four systems shown in FIGS. 1 through 4 include resistor networks having relative resistor values which provide a maximum signal voltage swing into the receivers, while maintaining input voltage magnitudes at the same positive values for the two inputs producing a "1" output, and at equal negative values for the two inputs producing a "0" output. Other resistor values may be used, but they will involve a reduction in noise immunity, and/or an increased variation in the time responses of the receiver.

Other transmitter-receiver unit configurations may be employed in which the resistor networks are constructed to maximize the differential input signals at the receiver input terminals, and provide differential input signals of equal magnitudes for all logic conditions.

What is claimed is:

1. The combination of a balanced transmission line, a transmit-receive unit at each end of the transmission line, each transmit-receive unit including:

a characteristic impedance termination including a terminating resistor in circuit with each conductor of the transmission line, a transmitter having first and second output terminals for supplying digital voltage signals through the terminating resistors to the transmission line, a differential receiver having a normal input terminal and an inverting input terminal, first and second resistors of substantially equal values connected from the ends of said transmission line to respective normal and inverting inputs of said receiver, a third resistor of value larger than said first and second resistors connected from the first output of said transmitter to the inverting input of said receiver, and a fourth resistor of value equal to said third resistor connected from the second output of said transmitter to the normal input of said receiver.

2. The combination as defined in claim 1 and in addition, fifth and sixth resistors connecting the inputs of the receiver to a point of reference potential.

3. The combination as defined in claim 1 wherein said third and fourth resistors have a value equal to substantially twice the value of said first and second resistors.

* * * * *